(12) United States Patent
Jin et al.

(10) Patent No.: US 8,223,740 B2
(45) Date of Patent: Jul. 17, 2012

(54) METHOD OF TRANSMITTING FEEDBACK INFORMATION IN A MULTI-INPUT, MULTI-OUTPUT (MIMO) SYSTEM

(75) Inventors: Yong Suk Jin, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 495 days.

(21) Appl. No.: 12/467,972

(22) Filed: May 18, 2009

(65) Prior Publication Data
US 2009/0225890 A1 Sep. 10, 2009

Related U.S. Application Data

(63) Continuation of application No. 11/367,917, filed on Mar. 3, 2006, now Pat. No. 7,633,906.

(30) Foreign Application Priority Data

Mar. 4, 2005 (KR) .................. 10-2005-0017999

(51) Int. Cl.
*H04J 3/24* (2006.01)

(52) U.S. Cl. ........ 370/349; 370/334; 370/328; 455/419; 455/69; 709/230

(58) Field of Classification Search .................. 370/328, 370/338, 252, 253, 334, 332, 349, 389; 455/419, 455/450–452.1, 516, 562.1, 418, 69, 423, 455/67.11, 67.13; 709/230
See application file for complete search history.

(56) References Cited

U.S. PATENT DOCUMENTS

2001/0033579 A1 10/2001 Nelson, Jr. et al.
2008/0069031 A1* 3/2008 Zhang et al. .................. 370/328

FOREIGN PATENT DOCUMENTS

CN 101156322 4/2008

OTHER PUBLICATIONS

B. Ihm et al., "Enhanced MAC Feedback Header," IEEE 802.16 Broadband Wireless Access Working Group, IEEE C802.16e-04/537r2, Nov. 2004, XP-002628508.
IEEE, "Part 16: Air Interface for Fixed and Mobile Broadband Wireless Access Systems—Amendment for Physical and Medium Access Control Layers for Combined Fixed and Mobile Operation in Licensed Bands," IEEE P802.16e/D5, Sep. 2004, pp. I-XX, 1-356, XP-002628509.
B. Ihm et al., "Framework for Enabling Closed-Loop MIMO for OFDMA," IEEE 802.16 Broadband Wireless Access Working Group, IEEE C802.16e-04/552r7, Jan. 2005, XP-002628510.

(Continued)

*Primary Examiner* — Marcos Torres
(74) *Attorney, Agent, or Firm* — Lee, Hong, Degerman, Kang & Waimey

(57) ABSTRACT

A method of transmitting feedback information in a Multi-Input, Multi-Output (MIMO) system is disclosed. In the method, a mobile station (MS) which determines to transmit feedback information and feedback type to a base station (BS) without solicitation from the BS, wherein the feedback type is transmission antenna type, and transmits the feedback information using a MIMO mode feedback extended sub-header, wherein the MIMO mode feedback extended sub-header appears between a Medium Access Channel (MAC) header and a payload.

8 Claims, 2 Drawing Sheets

OTHER PUBLICATIONS

Ali et al., "Performance Evaluation of Candidate MAC Protocols for LMCS/LMDS Networks," IEEE Journal on Selected Areas in Communications, vol. 18, Issue 7, Jul. 2000, pp. 1261-1270.

Chesterfield et al., "An Extensible RTCP Control Framework for Large Multimedia Distributions," Proceedings of the Second IEEE International Symposium on Network Computing and Applications, Apr. 16, 2003, pp. 351-358.

H. Zheng et al., "Multiple ARQ Processes for MIMO Systems," Proceedings of the 13th IEEE International Symposium on Personal, Indoor and Mobile Radio Communications (PIMRC), vol. 3, pp. 1023-1026, Sep. 2002.

IEEE Standards Committee, "Part 16: Air Interface for Fixed and Mobile Broadband Wireless Access Systems—Amendment for Physical and Medium Access Control Layers for Combined Fixed and Mobile Operation in Licensed Bands," IEEE P802.16e/D5, Sep. 2004.

Ori, Z., et al., "Generic Sleep Corrections", IEEE 802.16 Broadband Wireless Access Working Group, IEEE C802.16e-05/028r2, Jan. 27, 2005.

Roh, W., et al., "Framework for Enabling Closed-loop MIMO for OFDMA", IEEE 802.16 Broadband Wireless Access Working Group, IEEE C802.16e-04/552r6, Jan. 26, 2005.

Zhang, H., et al., "Text Clarification and Clean-up for the MAC Header", IEEE 802.16 Broadband Wireless Access Working Group, IEEE C802.16e-05/210r1, May 4, 2005.

Jin, Y., et al., "Clarification of MAC Extended Subheader", IEEE 802.16 Broadband Wireless Access Working Group, IEEE C802.16e-05/236r0, Apr. 27, 2005.

Y. Jin et al., "Feedback request subheader," IEEE 802.16 Broadband Wireless Access Working Group, IEEE C802.16e-05/041r2, Jan. 2005.

* cited by examiner

METHOD OF TRANSMITTING FEEDBACK INFORMATION IN A MULTI-INPUT, MULTI-OUTPUT (MIMO) SYSTEM

This application is a continuation of U.S. application Ser. No. 11/367,917, filed Mar. 3, 2006, now U.S. Pat. No. 7,633,906, which pursuant to 35 U.S.C. §119(a) claims the benefit of Korean Application No. P10-2005-17999, filed on Mar. 4, 2005, which are hereby incorporated by reference.

BACKGROUND OF THE INVENTION

1. Field of the Invention

The present invention relates to a method of transmitting feedback information, and more particularly, to a method of transmitting feedback information in a Multi-Input, Multi-Output (MIMO) system.

2. Discussion of the Related Art

A Multi-Input, Multi-Output (MIMO) system seeks to improve frequency efficiency and capacity of a network link by using a plurality of antennas in a base station (BS) as well as in a mobile station (MS). As such, the MIMO system has been receiving much attention as useful technology for transmitting high speed data in a mobile wireless communication system.

In a closed-loop MIMO system having plurality of antennas, the MS receives data transmitted from the BS and estimates channel information of each channel. Then the MS uses the estimated channel information to obtain a weight value which is subsequently transmitted as feedback information to the BS. After receiving the feedback information, the BS applies the weight value to input data so as to more effectively and efficiently transmit the input data to the MS.

In an Orthogonal Frequency Division Multiple/Orthogonal Frequency Division Multiple Access (OFDM/OFDMA) system, the BS receives from the MS various types of feedback information to be applied to downlink signals. In the MIMO system, there are various modes that can be applied for transmission based on the data transmission scheme used by the multiple antennas of the transmitting end. These modes include a Space Time Transmit Diversity (STTD), a Spatial Multiplexing (SM), and a closed-loop SM. Furthermore, in the closed-loop MIMO system, there are five (5) types of feedback information that can be transmitted to the BS from the MS.

The first type is an antenna grouping index. The antenna grouping index applies when the closed-loop STTD scheme is used. More specifically, a pair of antennas, which has achieved STTD, can be changed based on channel status, and an index of the optimum pair of antennas are provided by the MS to the BS.

The second type is an antenna selection index. The antenna selection index applies when a closed-loop STTD scheme or a SM scheme is used. More specifically, a specified number of antennas having best channel status are selected from a plurality of antennas, and indices of the selected antennas are sent to the BS.

The third type is a precoding codebook index. The precoding codebook index applies when a closed-loop SM scheme is used. More specifically, the precoding matrix codebook, which is multiplied to the transmission signal at the BS transmission antenna group, are retained by both the BS and the MS, and the MS selects and provides ith the optimum preceding matrix with respect to channel status to the BS.

The fourth type is a directed precoding matrix value. The directed precoding matrix value applies when a closed-loop SM scheme is used. More specifically, the MS directly provides a value of the precoding matrix. The precoding matrix is multiplied to the transmission signal at the BS transmission antenna group.

The fifth type is a number of streams. The number of streams applies when a STTD scheme or a SM scheme is used. More specifically, the MS provides a number of transmission signals, which can be used to achieve optimum transmission capacity in either scheme, to the BS. Here, the number of transmission signals is identical to the number of simultaneously transmitted transmission symbols.

In addition to five (5) types of feedback information, the feedback information can include the MS selected MIMO mode a permutation scheme associated with the selected mode. The details of which are provided below.

In the OFDM/OFDMA wireless communication system, the MS determines the permutation scheme and transmits the determined permutation scheme to the BS in a form of feedback information. Here, determining permutation scheme means that the MS determines the scheme by which data in a frequency broadband for data transmission is allocated and arranged. That is, the MS selects any one of a Full Usage Sub-Carrier (FUSC), a Partial Usage Sub-Carrier (PUSC), and an Adjacent Sub-Carrier Permutation schemes.

Transmitting the feedback information of the MIMO mode and the permutation scheme selected by the MS or the weight to be applied for downlink transmission in the closed-loop MIMO system can be accomplished using the following processes. First, the BS transmits to the MS information containing the feedback types to be used in sending feedback information to the BS and the feedback time period according which the MS should transmit feedback information to the BS. This information can be transmitted using any one of an Information Element (IE) for providing a Channel Quality Information Channel (CQICH), a fast feedback allocation subheader which is transmitted together with data, and a Feedback Polling IE which is used by the BS to allocate uplink resource.

After receiving the information the feedback types and the feedback period, the MS can use a fast feedback channel on an allocated frame to send feedback information periodically or use a feedback header in the allocated uplink resource to transmit feedback information periodically or non-periodically. If there is data to be transmitted to the BS, the MS uses the subheader to transmit the data.

The following problems exist with respect to the above description. First, a procedure for transmitting (reporting) a MIMO mode and permutation scheme selected by the MS is different from a procedure for transmitting (reporting) determined weight. Second, although there are currently three (3) types of methods for transmitting weights to be applied to downlink transmission, there is no information as to which method should be applied. Lastly, there is no disclosure relating to a method of transmitting a direct precoding matrix value.

SUMMARY OF THE INVENTION

Accordingly, the present invention is directed to a method of transmitting feedback information in a Multi-Input, Multi-Output (MIMO) system that substantially obviates one or more problems due to limitations and disadvantages of the related art.

An object of the present invention is to provide a method of transmitting feedback information in a Multi-Input, Multi-Output (MIMO) system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting feedback information in a Multi-Input, Multi-Output (MIMO) system includes a mobile station (MS) which determines to transmit feedback information and feedback type to a base station (BS) without solicitation from the BS, wherein the feedback type is transmission antenna type, and transmits the feedback information using a MIMO mode feedback extended subheader, wherein the MIMO mode feedback extended subheader appears between a Medium Access Channel (MAC) header and a payload.

In another aspect of the present invention, the MS generates a Protocol Data Unit (PDU) which includes a Medium Access Channel (MAC) header, an extended subheader group and a payload, wherein the MAC header includes information on whether or not an extended subheader group appears after the MAC header, and wherein the extended subheader group includes a MIMO mode feedback extended subheader. Furthermore, the MS transmits the PDU which includes the MAC header and the MIMO mode feedback extended subheader, wherein the MIMO mode feedback extended subheader includes a request for a change in an antenna transmission type.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the conventional art, there is no method of notifying existence of a fast uplink feedback subheader. Table 1 and Table 2 illustrate examples of data format of a mode selection feedback subheader.

TABLE 1

| Name | Length (bits) | Description |
| --- | --- | --- |
| Feedback Type | 4 | Indicate the type of feedback (See Table 2) |
| Feedback Content | 4 | Content of the feedback |

TABLE 2

| Feedback Type | Description |
| --- | --- |
| 0b0000 | MIMO mode and permutation. If set to this type, the feedback content is described in Table 3 |
| 0b0001-0b1111 | Reserved |

Figure 1:
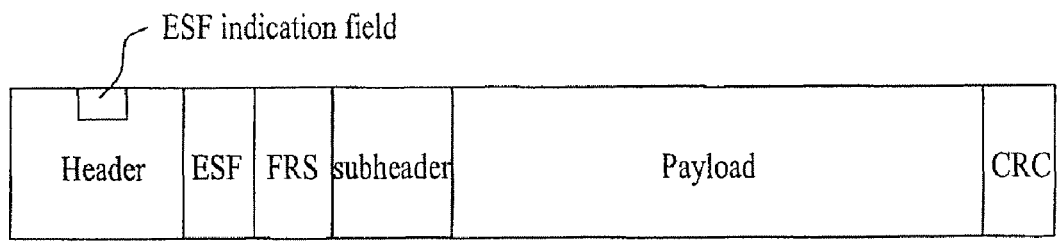
FIG. 1 illustrates an example of data structure of a Medium Access Control (MAC) Protocol Data Unit (PDU) in an OFDMA broadband wireless access system.
Figure 2:
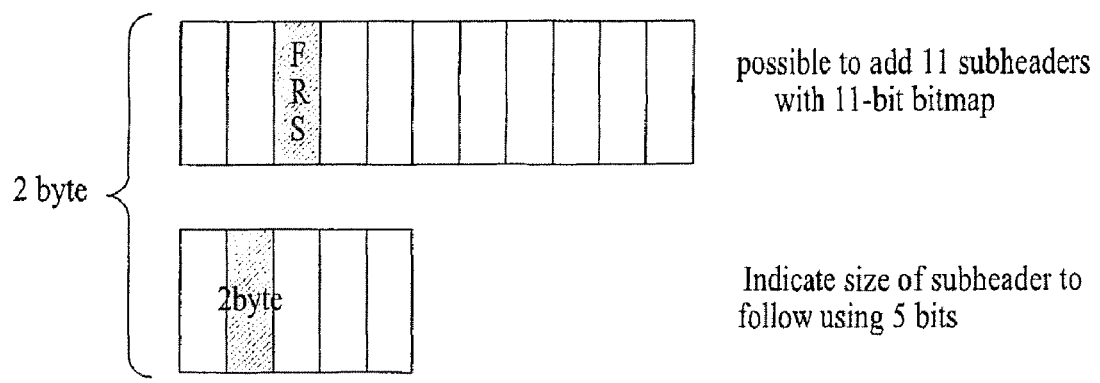
FIG. 2 illustrates a detailed description of the ESF of FIG. 1.

The mode selection feedback subheader is used by the MS after a MIMO mode and a permutation scheme to be used for transmission is selected. The mode selected feedback subheader is not used by itself. That is, as illustrated in FIGS. 1 and 2, an Extended Subheader Field (ESF) notifies the existence and contents of the mode selected feedback subheader. More specifically, FIG. 1 illustrates an example of data structure of a Medium Access Control (MAC) Protocol Data Unit (PDU) in an OFDMA broadband wireless access system. FIG. 2 illustrates a detailed description of the ESF of FIG. 1.

As illustrated in FIG. 1, by including an indication field to indicate whether an ESF exists or not, more and/or different types of subheaders can be included between the header and the subheader. To put differently, since the ESF field is comprised of 2 bytes, a bitmap of 11 bits can be used to indicate existence of 11 subheaders and remaining 5 bits can be used to indicate size(s) of subheader(s).

Table 3 shows a MIMO mode and permutation scheme mapped to a 4-bit payload.

TABLE 3

| Value | Description |
| --- | --- |
| 0b0000 | STTD and PUSC/FUSC permutation |
| 0b0001 | STTD and adjacent-subcarrier permutation |
| 0b0010 | SM and PUSC/FUSC permutation |
| 0b0011 | SM and adjacent-subcarrier permutation |
| 0b0100 | Closed-loop SM and PUSC/FUSC permutation |
| 0b0101 | Closed-loop SM and adjacent-subcarrier permutation |
| 0b0110 | Closed-loop SM + Beamforming and adjacent-subcarrier permutation |
| 0b1000~0b1111 | Reserved |

Table 4 is an example of a data type of a fast uplink feedback subheader which is transmitted as feedback to the BS after the MS determines weight for downlink transmission quality enhancement in a closed-loop MIMO system.

TABLE 4

| Name | Length (bits) | Description |
| --- | --- | --- |
| Feedback type | 2 | Indicate the type of feedback. The same mapping applies as the Feedback type field in table 5. |
| Feedback content | 6 | Content of the feedback. The same mapping applies as in table 5. |

Table 5 describes an example of feedback contents. In Table 5, the index value, which indicates antenna grouping, antenna selection, and precoding codebook, can use any three values from 0b101110~0b110110.

TABLE 5

| Value | Description |
| --- | --- |
| 0b101000 | STTD and PUSC/FUSC permutation |
| 0b101001 | STTD and adjacent-subcarrier permutation |
| 0b101010 | SM and PUSC/FUSC permutation |
| 0b101011 | SM and adjacent-subcarrier permutation |
| 0b101100 | Hybrid and PUSC/FUSC permutation |
| 0b101101 | Hybrid and adjacent-subcarrier permutation |
| 0b101110~0b110110 | Interpretation according to table 296e, 296f or 296g, depending on in antenna grouping, antenna selection or a reduced preceding matrix code book is used. |
| 0b110111 | Closed loop preceding with 1 stream. |
| 0b111000 | Closed loop preceding with 2 stream |
| 0b111001 | Closed loop preceding with 3 stream. |
| 0b111010 | Closed loop preceding with 4 stream. |
| 0b11101~0b111111 | reserved |

To improve downlink channel capability, the BS transmits feedback type and feedback period to the MS so as to receive channel estimation value and a method of transmitting the most appropriate MIMO mode and weight value in the closed-loop MIMO system. It is also possible to transmit MIMO mode change request or use a method for transmitting precoding weight/antenna weight as feedback information to the BS without solicitation from the BS.

If the BS requests for or solicits a specific feedback type, the MS transmits an indicator for indicating the specific feedback type and corresponding the feedback content as feedback to the BS. Even if the MS does not receive any request or solicitation from the BS, the MS can voluntarily select and transmit desired/preferred MIMO mode or use a method for transmitting precoding weight/antenna weight to the BS.

As an example of transmitting a specific feedback type to the BS, if the MS has data to transmit to the BS, preferably, the MS transmits feedback information by including the indicator used to indicate the feedback type and the feedback content in the subheader of the MAC PDU (e.g., MIMO mode feedback subheader).

As described above, FIG. 1 illustrates an example of a MAC PDU data structure according to an embodiment of the present invention. In FIG. 1, the existence of the MIMO mode feedback subheader according to the embodiment of the present invention is indicated via the ESF, which occupies a portion of the header. Moreover, the subheader types that can be employed by the ESF are determined, and at the same time, the size of the ESF is determined based on characteristics of the subheaders (e.g., number of subheaders and types of subheaders).

Figure 3:
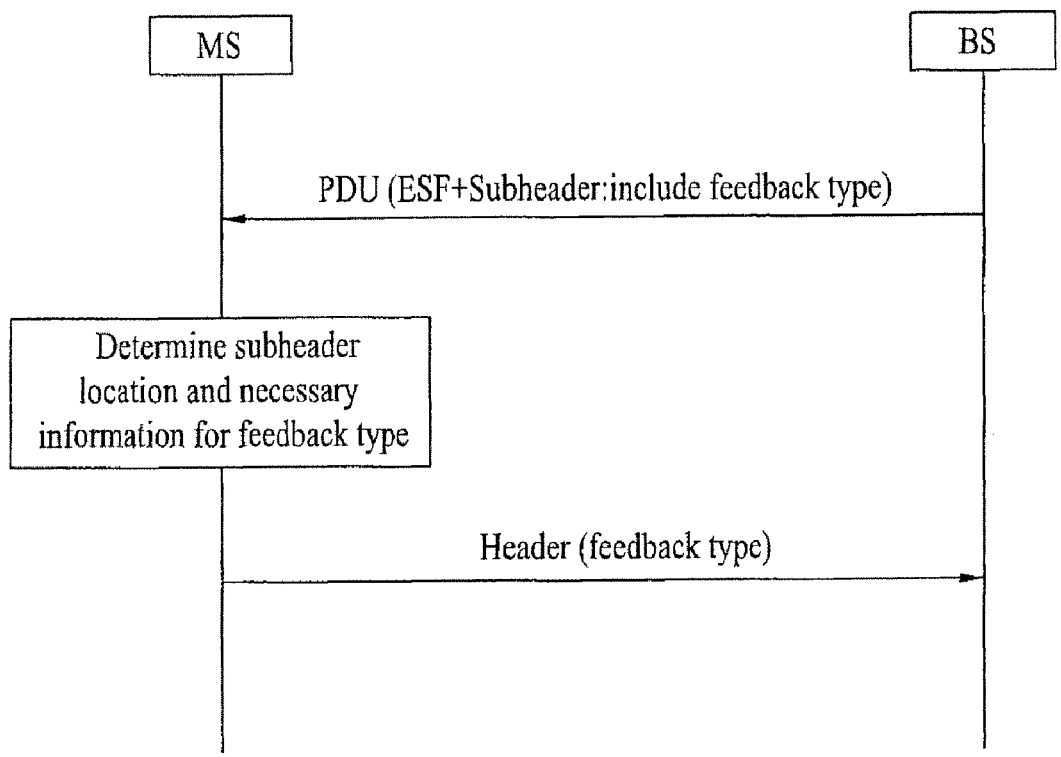
FIG. 3 illustrates an example of a process between a mobile station (MS) and a base station (BS) according to an embodiment of the present invention.

FIG. 3 illustrates an example of a process between the MS and the BS according to an embodiment of the present invention. In FIG. 3, the BS transmits the MAC PDU which includes the ESF and subheader to indicate the feedback type. Upon receipt, the MS determines the location of the subheader(s) that can be included between the header and the payload. The MS further determines the necessary information for the feedback type. Thereafter, the MS transmits to the BS the header, without the payload, to notify the BS of the determined feedback type.

Table 6 shows an example of a bitmap structure which notifies the existence of the MIMO mode feedback subheader within the ESF.

TABLE 6

| ESF bit | Name | Length(bytes) |
| --- | --- | --- |
| #0 (LSB) | UL MIMO mode feedback subheader | 1 |
| #1 | Reserved | |

Table 7 depicts an example of the contents of a MIMO mode feedback subheader. In FIG. 7, 'Feedback type' has a length of 2 bits and functions as an indicator for the contents for which the MS seeks to make a request. Furthermore, 'Feedback content' has a length of 6 bits and can have the capability to distinguish the applied methods in 0b101110~0b110110 of Table 5.

TABLE 7

| Name | Length (bits) | Description |
| --- | --- | --- |
| Feedback type | 2 | 00: Mode selection and Permutation and Stream number<br>01: Antenna grouping<br>10: Antenna selection<br>11: Preceding matrix code book |
| Feedback contents | 6 | If Feedback type is '00,' refer to Table 5<br>If Feedback type is '01', refer to Table 8<br>If Feedback type is '10', refer to Table 9<br>If Feedback type is '11,' refer to Table 10 |

TABLE 8

| Value | Description |
| --- | --- |
| 0b101110 | Antenna Group A1 for rate 1<br>For 3-antenna BS, See 8.4.8.3.4<br>For 4-antenna BS, See 8,4,8,3,5 |
| 0b101111 | Antenna Group A2 for rate 1 |
| 0b110000 | Antenna Group A3 for rate 1 |
| 0b110001 | Antenna Group B1 for rate 2<br>For 3-antenna BS, See 8.4.8.3.4<br>For 4-antenna BS, See 8.4.8.3.5 |
| 0b110010 | Antenna Group B2 for rate 2 |
| 0b110011 | Antenna Group B3 for rate 2 |
| 0b110100 | Antenna Group B4 for rate 2 (only for 4-antenna BS) |
| 0b110101 | Antenna Group B5 for rate 2 (only for 4-antenna BS) |
| 0b110110 | Antenna Group B6 for rate 2 (only for 4-antenna BS) |

TABLE 9

| Value | Description |
| --- | --- |
| 0b101110 | Antenna selection option 0 |
| 0b101111 | Antenna selection option 1 |
| 0b110000 | Antenna selection option 2 |
| 0b110001 | Antenna selection option 3 |
| 0b110010 | Antenna selection option 4 |
| 0b110011 | Antenna selection option 5 |
| 0b110100 | Antenna selection option 6 |
| 0b110101 | Antenna selection option 7 |
| 0b110110 | reserved |

TABLE 10

| Value | Description |
| --- | --- |
| 0b101110 | Reduced Preceding matrix code book entry 0 |
| 0b101111 | Reduced Preceding matrix code book entry 1 |
| 0b110000 | Reduced Preceding matrix code book entry 2 |
| 0b110001 | Reduced Preceding matrix code book entry 3 |
| 0b110010 | Reduced Preceding matrix code book entry 4 |
| 0b110011 | Reduced Preceding matrix code book entry 5 |

TABLE 10-continued

| Value | Description |
|---|---|
| 0b110100 | Reduced Precoding matrix code book entry 6 |
| 0b110101 | Reduced Precoding matrix code book entry 7 |
| 0b110110 | reserved |

In the embodiment of the present invention, the contents of Table 5 and Tables 7-10 are known and/or kept by both the BS and the MS. With this basis, 'Feedback type' can be assigned using the subheader of Table 7 while 'Feedback content' having a 6-bit length of Table 5 and Tables 8-10 can be transmitted as feedback information according to the assigned 'Feedback type.' Based on such arrangement, various feedback types can be transmitted via a single subheader. Table 5 and Tables 8-10 are merely examples of feedback contents used to illustrate the embodiment of the present invention.

Preferably, the MIMO mode feedback subheader can include use a method for transmitting precoding weight/antenna weight used in the closed-loop MIMO system as well as the MIMO mode and permutation scheme. In addition, it is preferable to include an indicator for indicating in detail (e.g., more precisely) the method to be used for transmitting weight values from a plurality methods for transmitting precoding weight/antenna weight.

Furthermore, with respect to the directed precoding matrix value, it is preferable to quantize the directly determined weight value and transmit the quantized value using 6 bits per each element of the matrix.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting feedback information in a Multi-Input, Multi-Output (MIMO) system, the method comprising:
    receiving, by a mobile station (MS), a feedback type field; and
    transmitting, by the MS, a Protocol Data Unit (PDU) that includes a Medium Access Channel (MAC) header, an extended subheader group and a payload,
    wherein the MAC header includes an Extended Subheader field (ESF) indicating that the extended subheader group is present in the PDU,
    wherein the extended subheader group appears immediately after the MAC header and comprises a MIMO mode feedback extended subheader, and
    wherein the MIMO mode feedback extended subheader comprises a feedback contents field that includes at least antenna grouping information, antenna selection information, or reduced precoding matrix codebook information based on the received feedback type field.

2. The method according to claim 1, wherein the MIMO mode feedback extended subheader appears in a first Protocol Data Unit (PDU) transmitted by the MS.

3. A mobile station for transmitting feedback information in a Multi-Input, Multi-Output (MIMO) system, the mobile station comprising:
    a transmission module for transmitting a radio signal; and
    a reception module for receiving a radio signal,
    wherein the mobile station is configured to:
        receive a feedback type field via the reception module; and
        transmit a Protocol Data Unit (PDU) via the transmission module, the PDU including a Medium Access Channel (MAC) header, an extended subheader group and a payload,
    wherein the MAC header includes an Extended Subheader field (ESF) indicating that the extended subheader group is present in the PDU,
    wherein the extended subheader group appears immediately after the MAC header and comprises a MIMO mode feedback extended subheader, and
    wherein the MIMO mode feedback extended subheader comprises a feedback contents field that includes at least antenna grouping information, antenna selection information, or reduced precoding matrix codebook information based on the received feedback type field.

4. The mobile station of claim 3, wherein the MIMO mode feedback extended subheader appears in a first Protocol Data Unit (PDU) transmitted by the MS.

5. A method of receiving feedback information in a Multi-Input, Multi-Output (MIMO) system, the method comprising:
    transmitting, by a base station (BS), a feedback type field; and
    receiving, by the BS, a Protocol Data Unit (PDU) that includes a Medium Access Channel (MAC) header, an extended subheader group and a payload,
    wherein the MAC header includes an Extended Subheader field (ESF) indicating that the extended subheader group is present in the PDU,
    wherein the extended subheader group appears immediately after the MAC header and comprises a MIMO mode feedback extended subheader, and
    wherein the MIMO mode feedback extended subheader comprises a feedback contents field that includes at least antenna grouping information, antenna selection information, or reduced precoding matrix codebook information based on the feedback type field.

6. The method according to claim 5, wherein the MIMO mode feedback extended subheader appears in a first Protocol Data Unit (PDU) transmitted by the MS.

7. A base station (BS) for transmitting feedback information in a Multi-Input, Multi-Output (MIMO) system, the BS comprising:
    a transmission module for transmitting a radio signal; and
    a reception module for receiving a radio signal,
    wherein the BS is configured to:
        transmit a feedback type field via the transmission module; and
        receive a Protocol Data Unit (PDU) via the reception module, the PDU including a Medium Access Channel (MAC) header, an extended subheader group and a payload,
    wherein the MAC header includes an Extended Subheader field (ESF) indicating that the extended subheader group is present in the PDU,
    wherein the extended subheader group appears immediately after the MAC header and comprises a MIMO mode feedback extended subheader, and
    wherein the MIMO mode feedback extended subheader comprises a feedback contents field that includes at least antenna grouping information, antenna selection information, or reduced precoding matrix codebook information based on the feedback type field.

8. The base station of claim 7, wherein the MIMO mode feedback extended subheader appears in a first Protocol Data Unit (PDU) transmitted by the MS.

* * * * *